(12) United States Patent
Lumb et al.

(10) Patent No.: US 8,156,405 B1
(45) Date of Patent: Apr. 10, 2012

(54) EFFICIENT REDUNDANT MEMORY UNIT ARRAY

(75) Inventors: Christopher R. Lumb, Mountain View, CA (US); R. Hugo Patterson, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 1077 days.

(21) Appl. No.: 12/011,984

(22) Filed: Jan. 29, 2008

Related U.S. Application Data (60) Provisional application No. 61/005,759, filed on Dec. 7, 2007.

(51) Int. Cl.
*H03M 13/00* (2006.01)
(52) U.S. Cl. .............................. 714/770; 714/774; 714/6
(58) Field of Classification Search .................. 714/770, 714/114, 6, 7, 714, 774
See application file for complete search history.

(56) References Cited

U.S. PATENT DOCUMENTS

| | | | | |
|---|---|---|---|---|
| 5,490,248 A * | 2/1996 | Dan et al. | ...................... | 714/6.22 |
| 7,147,524 B2 * | 12/2006 | Saito | ........................... | 440/61 R |
| 7,185,144 B2 * | 2/2007 | Corbett et al. | ................ | 711/114 |
| 7,257,676 B2 * | 8/2007 | Corbett et al. | ................ | 711/114 |
| 7,962,779 B2 * | 6/2011 | Patel et al. | .................... | 714/6.12 |

* cited by examiner

*Primary Examiner* — Fritz Alphonse
(74) *Attorney, Agent, or Firm* — Van Pelt, Yi & James LLP (57) ABSTRACT

A method of storing data is disclosed. A set of data blocks, including a plurality of proper subsets of data blocks, is stored. A plurality of first-level parity blocks is generated, wherein each first-level parity block is generated from a corresponding proper subset of data blocks within the plurality of proper subsets of data blocks without reference to other data blocks not in the corresponding proper subset. A second-level parity block is generated, wherein the second level parity block is generated from a plurality of data blocks included in at least two of the plurality of proper subsets of data blocks, and wherein recovery of a lost block in a given proper subset of data blocks is possible without reference to any data blocks not in the given proper subset.

20 Claims, 13 Drawing Sheets

EFFICIENT REDUNDANT MEMORY UNIT ARRAY

CROSS REFERENCE TO OTHER APPLICATIONS

This application claims priority to U.S. Provisional Patent Application No. 61/005,759 entitled EFFICIENT REDUNDANT MEMORY UNIT ARRAY filed Dec. 7, 2007 which is incorporated herein by reference for all purposes.

BACKGROUND OF THE INVENTION

Reliability and performance of memory units, including hard disc drives, is improved by arranging multiple memory units in an array, such as a Redundant Array of Independent Discs (or, RAID) system. For example, RAID Level 6 (or, RAID 6) arranges memory units to provide protection for double memory unit failure, and failures when a single memory unit is rebuilding.

Unfortunately, an issue that typically arises for a system such as a RAID 6 system which protects against multiple memory unit failure is that as the array gets larger, the probability of multiple memory unit failure increases, along with the time required to rebuild the failed memory units because of the size of the array. One current way to address this restriction is to split arrays to keep the size manageable, but each split array requires its own additional parity memory units which is expensive. There exists a need for an efficient RAID algorithm that protects against multiple memory unit failure without increasing the time required to rebuild failed memory units or requiring many additional expensive parity memory units.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
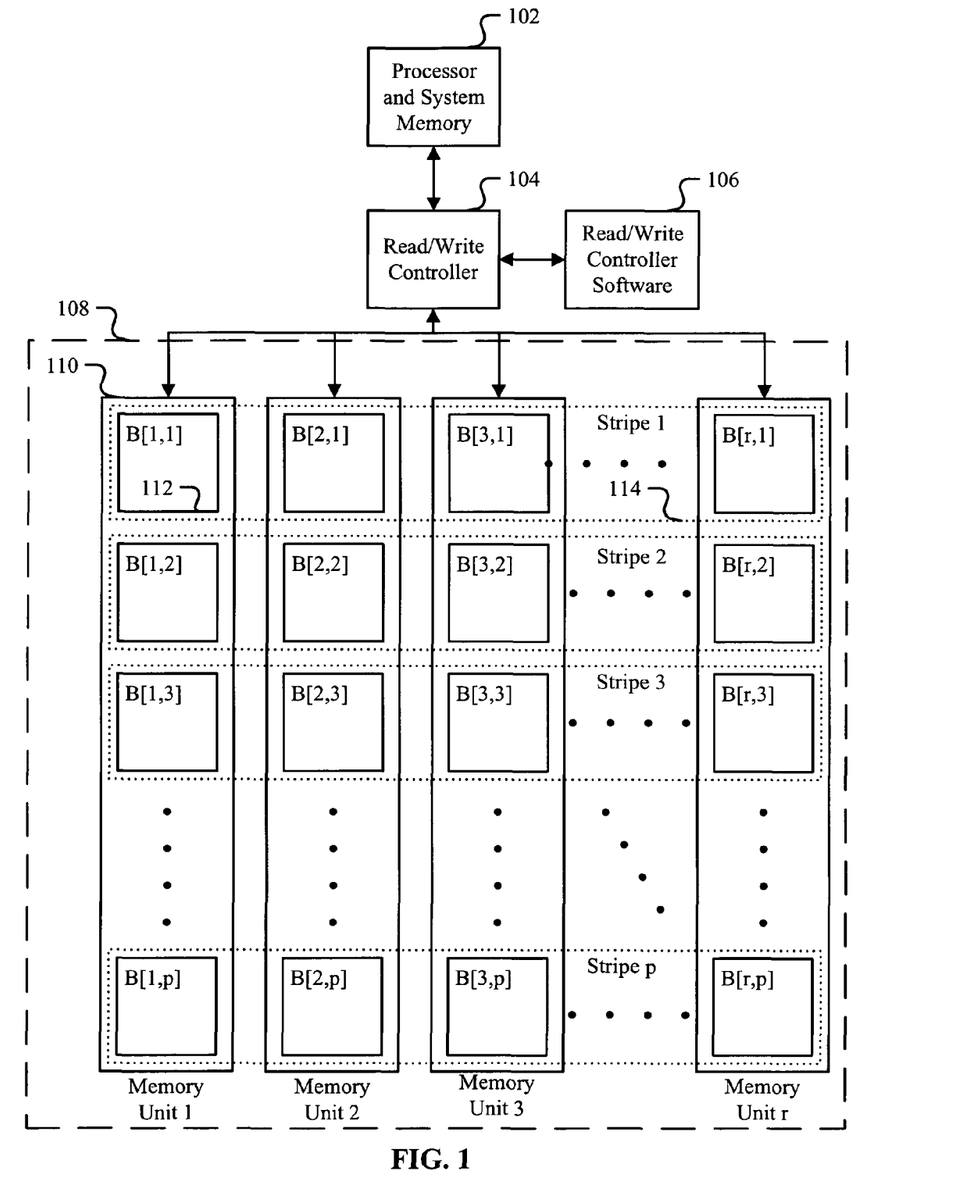
FIG. 1 is a block diagram illustrating an embodiment of a system for an efficient redundant memory unit array.

FIG. 1 is a block diagram illustrating an embodiment of a system for an efficient redundant memory unit array. In the example shown, the system processor and system memory 102 is coupled to a memory unit read/write controller 104, which executes read/write controller software 106. The read/write controller 104 is coupled to a memory unit array 108, which is a plurality of memory units 110, and in the example shown there are r memory units 110 in the memory unit array 108. In some embodiments the memory units 110 may be hard disc drives, magnetic drives, optical drives, random access memory ("RAM"), or solid state drives.

Each memory unit 110 is composed of a plurality of blocks 112. Blocks 112 may be a data block that stores system data, or a parity block that stores redundant information to protect integrity of data blocks. Parity blocks are necessary for the error detection and error correction of data blocks, and with one parity block for a set of data blocks, the system can recover from a single data or parity block failure. In the example shown there are p blocks 112 per memory unit 110. The blocks 112 are arranged logically in "stripes" such that the first block 112 from each memory unit 110; B[1,1], B[2,1], B[3,1], . . . , and B[r,1] form a first stripe 114. Similarly, the second block from each memory unit forms a second stripe, and so on for p stripes.

Figure 2:
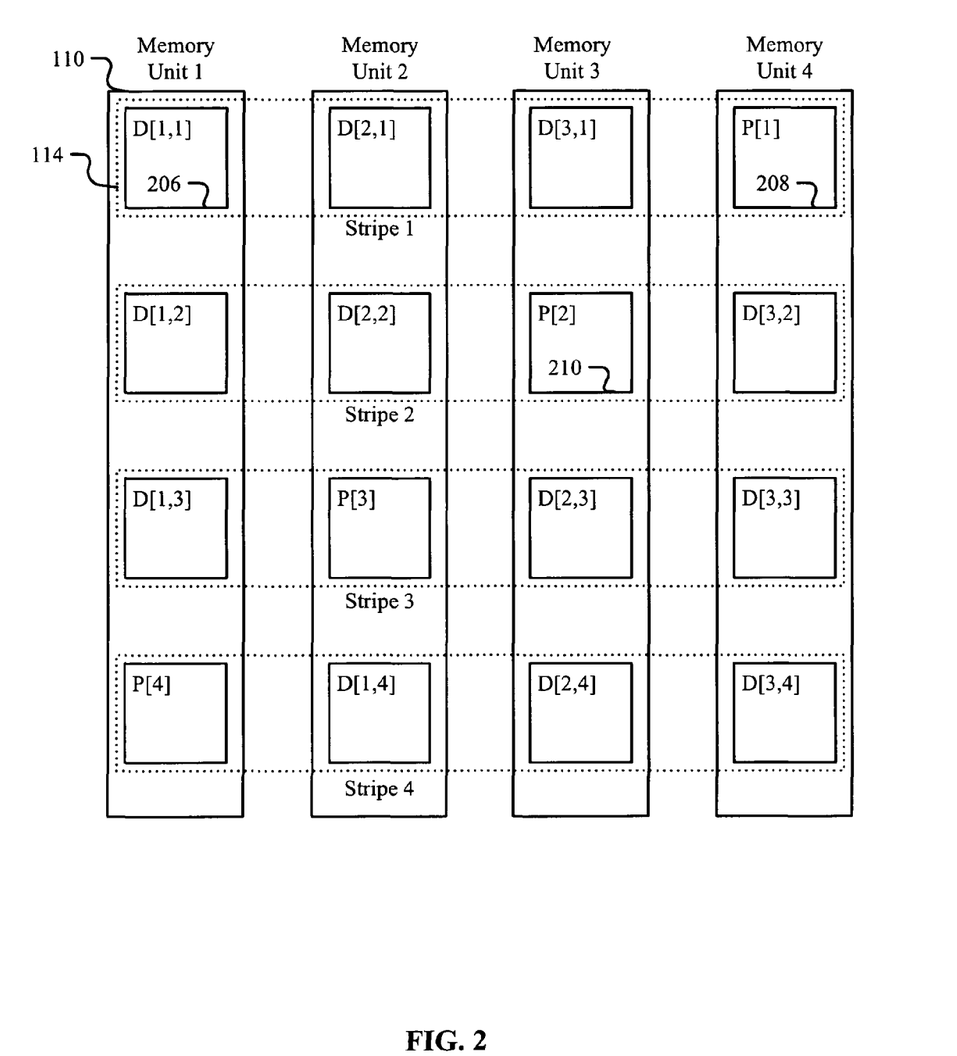
FIG. 2 is a block diagram illustrating an embodiment of a system with data blocks and parity blocks in a typical redundant memory unit array.

FIG. 2 is a block diagram illustrating an embodiment of a system with data blocks and parity blocks in a typical redundant memory unit array. The system may be implemented across memory units 110. In the example shown, there are four memory units 110 in the array 108, and four blocks per memory unit 110. The blocks are shown either as a data block 206 such as D[1,1], D[2,1], and D[3,1] in Stripe 1, or as a parity block 208 such as P[1] in Stripe 1.

In some embodiments, the parity blocks are "rotating", meaning that the physical position of the parity block within the stripe differs from stripe to stripe. In the example shown, the parity blocks are rotating in a sequential fashion such that parity block 208 in Stripe 1 is in Memory Unit 4, and the next parity block 210 in Stripe 2 is in the Memory Unit 3, and so on. Parity rotation is typically used to prevent a memory unit from becoming "hot", where a single memory unit failure causes a disproportionate share of disruption or data loss in the array.

Figure 3:
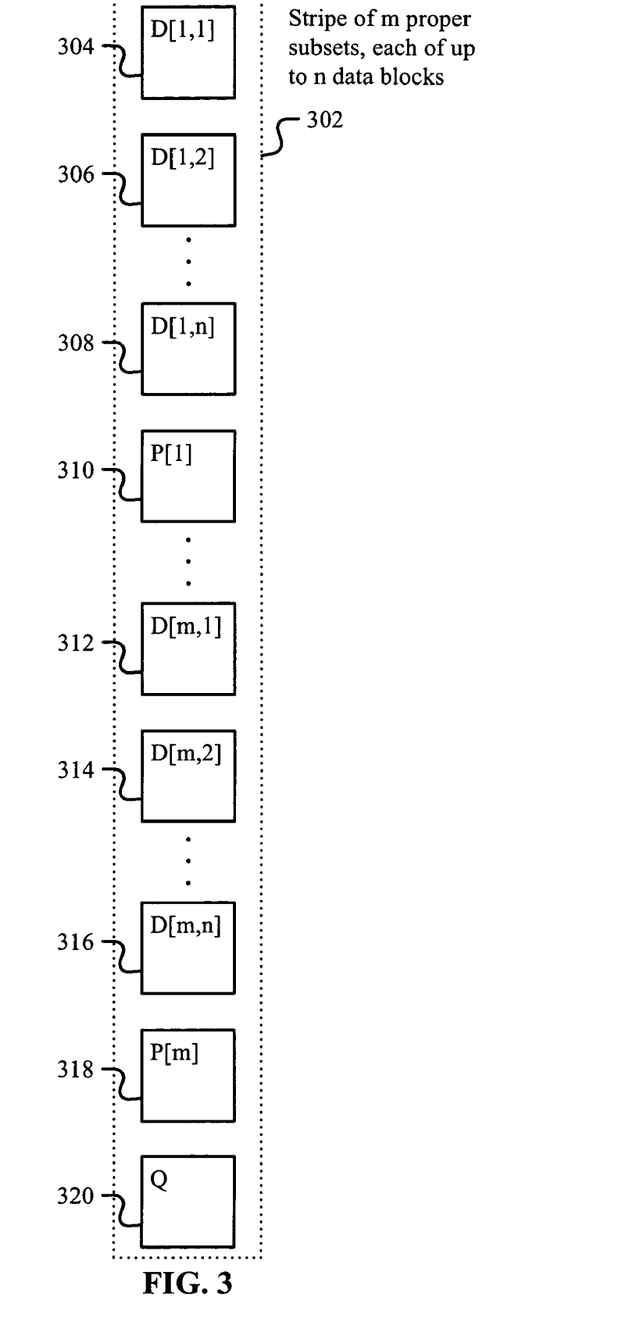
FIG. 3 is a block diagram illustrating an embodiment of a system for organizing the parity of an efficient redundant memory unit array.

FIG. 3 is a block diagram illustrating an embodiment of a system for organizing the parity of an efficient redundant memory unit array. Traditional redundant memory unit arrays strengthen their error detection and error correction capabilities by adding a second-level of parity to the scope of the existing first-level parity block. By adding a second-level of parity, an array can recover from two data or parity block failures. For example, in FIG. 2 a fifth memory unit could be introduced with a second-level parity block Q[1] which would protect D[1,1], D[2,1], D[3,1] and P[1]. In traditional arrays with second-level parity, a failure in two data blocks requires a "full reconstruction" that involves accessing each and every memory unit. Each access requires time and resources that makes a full reconstruction an expensive process. The time period of a full reconstruction should be minimized, as throughout its duration the array is vulnerable to permanent data loss if another memory unit fails.

What is disclosed is a technique for adding parity such that an array can recover from two data or parity block failures, without requiring a time-intensive full reconstruction. In the example shown, stripe 302 is partitioned into proper subsets of the set of data blocks, where throughout this specification, a "proper subset" refers to a portion of a given set of data blocks that is strictly contained in the given set, and thus there exists at least one data block which is not contained in the portion. The partitioning ensures that there are at least two proper subsets, and the union of the proper subsets includes every data block.

One consequence of partitioning stripe 302 into proper subsets is that there are at least two proper subsets for the stripe 302. Each proper subset is protected by one first-level parity block and all proper subsets are protected by a second-level parity block. In the example shown, the stripe 302 is partitioned into m proper subsets, each of n data blocks. Data blocks D[1,1] 304, D[1,2] 306, up to D[1,n] 308 are protected by first-level parity block P[1] 310. Similarly, each of the proper subsets are protected, up to data blocks D[m,1] 312, D[m,2] 314, up to D[m,n] 316 being protected by first-level parity block P[m] 318. Finally, a second-level parity block Q 320 protects the entire stripe 302.

In some embodiments, the first-level parity blocks P[1], . . . , P[m] only protect data blocks D[1,1], . . . , D[m,n] while the second level parity block Q only protects data blocks D[1,1], . . . , D[m,n].

In some embodiments, the first-level parity blocks P[1], . . . P[m] protect both data blocks D[1,1], . . . , D[m,n] and the second level parity block Q, while the second level parity block Q only protects data blocks D[1,1], . . . , D[m,n].

When using the disclosed technique, a double block failure does not require a full reconstruction. For example, if a data block from proper subset 2 and a data block from proper subset 5 fail, then the only blocks that require access during reconstruction are the data and first-level parity blocks from proper subset 2, the data and first-level parity blocks from proper subset 5, and the second-level parity block. By using the disclosed technique, the redundant memory unit array is efficient as the time period of a reconstruction is reduced, making it less expensive and less vulnerable to permanent data loss than a full reconstruction.

Figure 4:
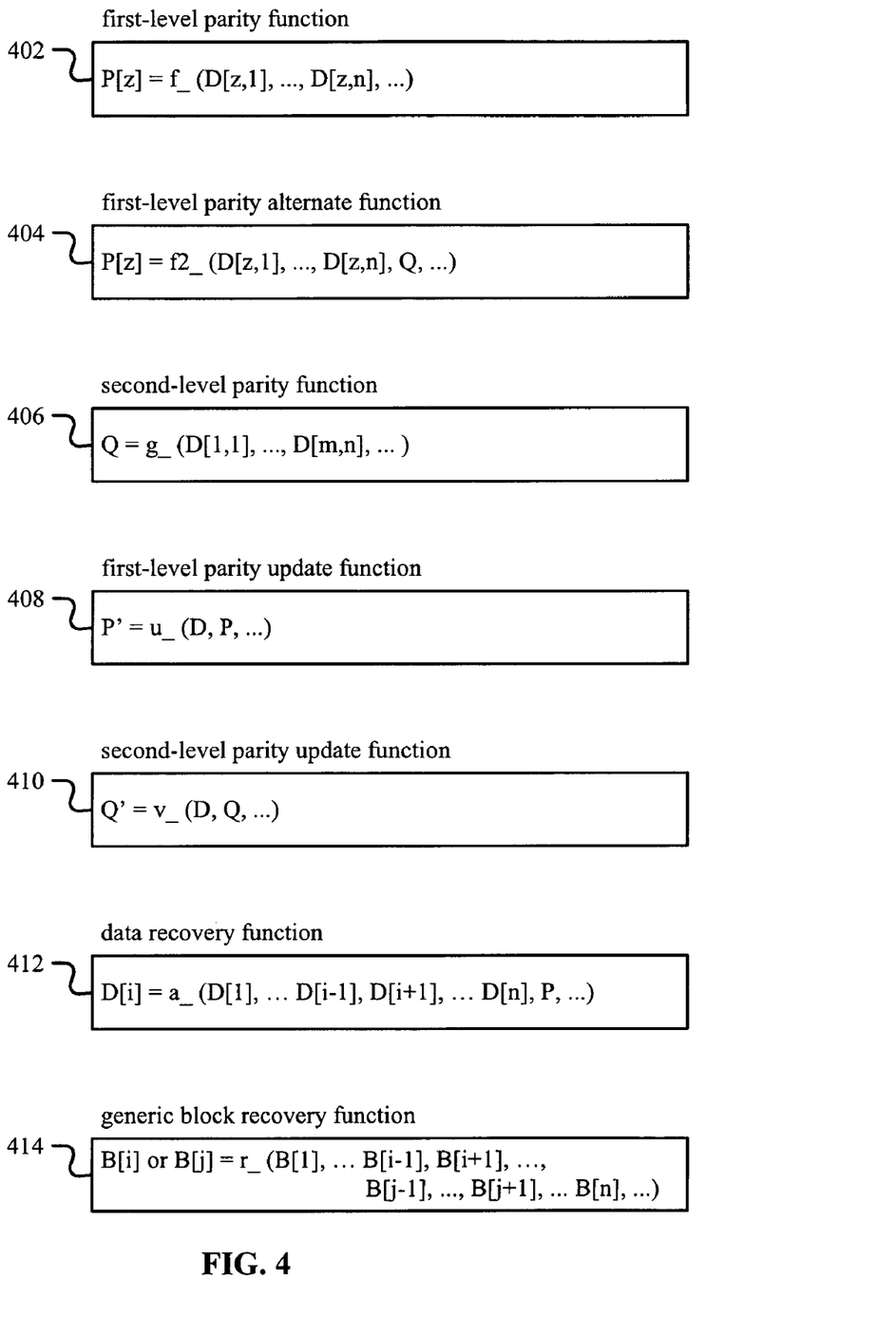
FIG. 4 is a diagram illustrating an embodiment of functions for implementing an efficient redundant memory unit array.

FIG. 4 is a diagram illustrating an embodiment of functions for implementing an efficient redundant memory unit array. These functions may be implemented in read/write controller 104.

In some embodiments, a first-level parity function of a given proper subset in a given stripe is as shown in 402, to calculate P[z], the first-level parity block of the z-th proper subset. P[z] is a function, f_, of at least D[z,1], . . . , and D[z,n], where D[x,y] is a y-th data block of an x-th proper subset in the given stripe where a proper subset has up to n data blocks.

In some embodiments, a first-level parity alternate function of a given proper subset in a given stripe is as shown in 404, to calculate P[z], the first-level parity block of the z-th proper subset. P[z] is a function, f2_, of at least Q, D[z,1], . . . , and D[z,n], where D[x,y] is a y-th data block of an x-th proper subset in the given stripe where a proper subset has up to n data blocks, and Q is the second-level parity block for the given stripe. The tradeoff between function 402 and function 404 is the function 404 parity coverage includes Q, at the expense of reconstruction time and access to the memory unit containing Q. The system designer thus chooses either function 402 or function 404 consistently throughout the efficient redundant memory unit array.

In some embodiments, a second-level parity function of a given stripe with m proper subsets of up to n data blocks is as shown in 406, to calculate Q, the second-level parity block of the given stripe. Q is a function, g_, of at least D[1,1], . . . , D[m,n], each data block in the stripe.

In some embodiments, a first-level parity update function of a given proper subset in a given stripe is as shown in 408, to calculate P', the updated first-level parity block after a data block D in the corresponding proper subset has been modified. P' is a function, u_, of at least D and P, where P is the first-level parity block before D was modified.

In some embodiments, a second-level parity update function of a given stripe is as shown in 410, to calculate Q', the updated second-level parity block after a data block D has been modified. Q' is a function, v_, of at least D and Q, where Q is the second-level parity block before D was modified.

In some embodiments, a data recovery function of a given proper subset in a given stripe is as shown in 412, to recalculate D[i], the i-th data block in the given proper subset, if the data within D[i] is lost. D[i] is a function, a_, of at least D[1], . . . D[i−1], D[i+1], . . . , D[n], and P, where P is the first-level parity block of the given proper subset.

In some embodiments, a generic block recovery function of a given proper subset in a given stripe is as shown in 414, to recalculate B[i], the i-th block in the given proper subset, if the data within two blocks, B[i] and B[j] is lost. B[i] is a function, r_, of at least B[1], . . . , B[i−1], B[i+1], . . . , B[j−1], B[j+1], . . . , B[n]. As shown in 414, i and j are merely locations of the two lost data blocks, and are interchangeable.

Figure 5:
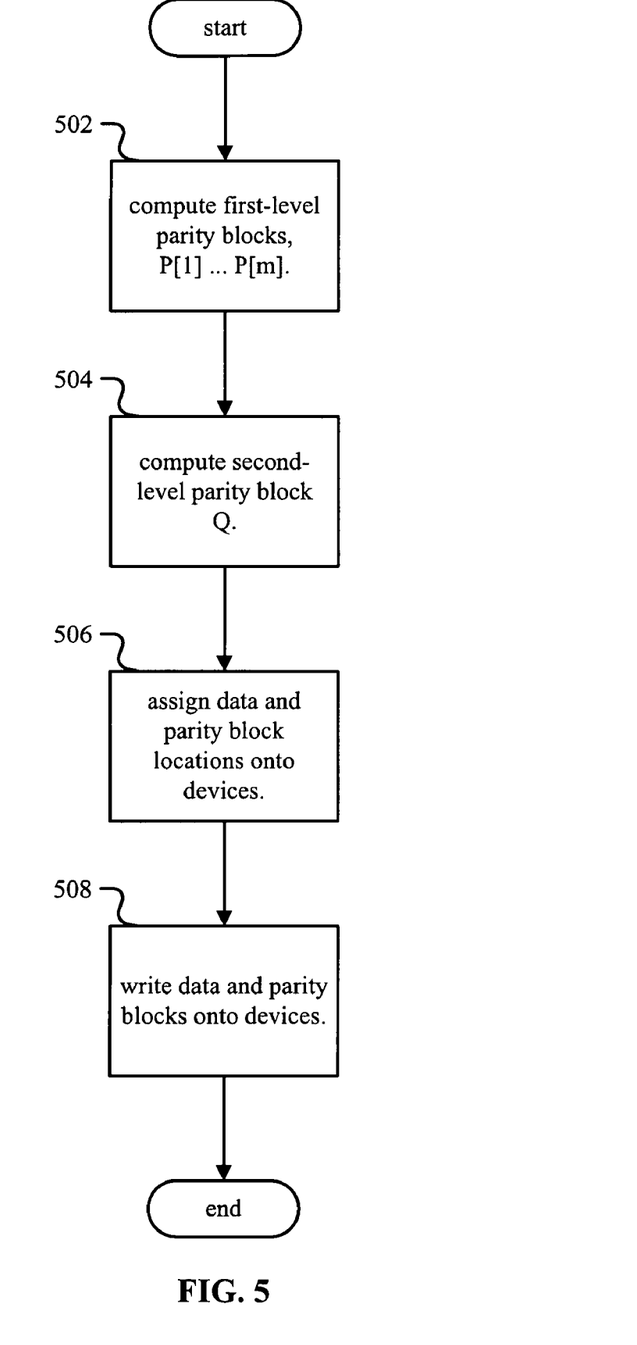
FIG. 5 is a flowchart illustrating an embodiment of a process for a whole stripe write of a given stripe.

FIG. 5 is a flowchart illustrating an embodiment of a process for a whole stripe write of a given stripe. Throughout this specification, a "whole stripe write" refers to the process of writing or rewriting data and parity blocks to a given stripe, such as when the stripe is first initialized. The process may be implemented in read/write controller 104.

In step 502, the first-level parity blocks, P[1], P[m] of each of the m proper subsets in the given stripe are computed using either first-level parity function 402 or first-level parity alternate function 404, depending on the system. In step 502, the second-level parity block Q of the given stripe is computed using second-level parity function 406.

In step 506, the data and parity block locations are assigned physical locations onto the efficient memory unit array. In some embodiments, parity rotation is used to alternate parity block locations between different stripes, similar to that shown in FIG. 2. In step 508, the data and parity blocks are written in the assigned physical locations onto the efficient memory unit array.

Figure 6:
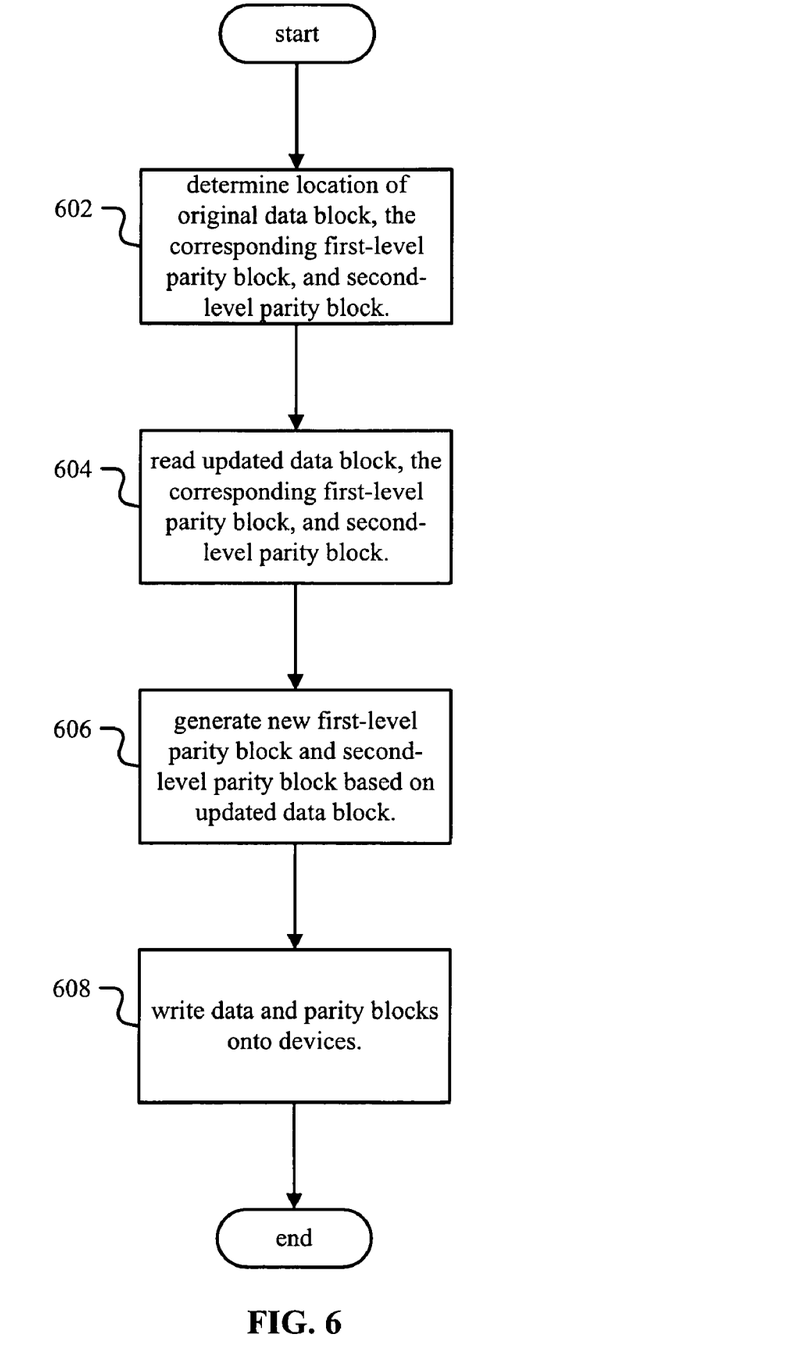
FIG. 6 is a flowchart illustrating an embodiment of a process for a single block update of a given stripe.

FIG. 6 is a flowchart illustrating an embodiment of a process for a single block update of a given stripe. Throughout this specification, a "single block update" refers to the process of updating a data block in a given proper subset of a given stripe. The process may be implemented in read/write controller 104.

In step 602, the location of the data block to be updated is determined, along with the location of the first-level parity block corresponding to the same proper subset as the data block, and the location of the second-level parity block. In step 604, the corresponding first-level parity block and second-level parity block are read, and the updated data block is read or loaded.

In step 606, an updated first-level parity block is calculated using the first-level parity update function 408 with the updated data block contents, and an updated second-level parity block is calculated using the second-level parity update function 410 with the updated data block contents. In step 608, the updated data, first-level parity and second-level parity blocks are written to the given stripe.

Figure 7:
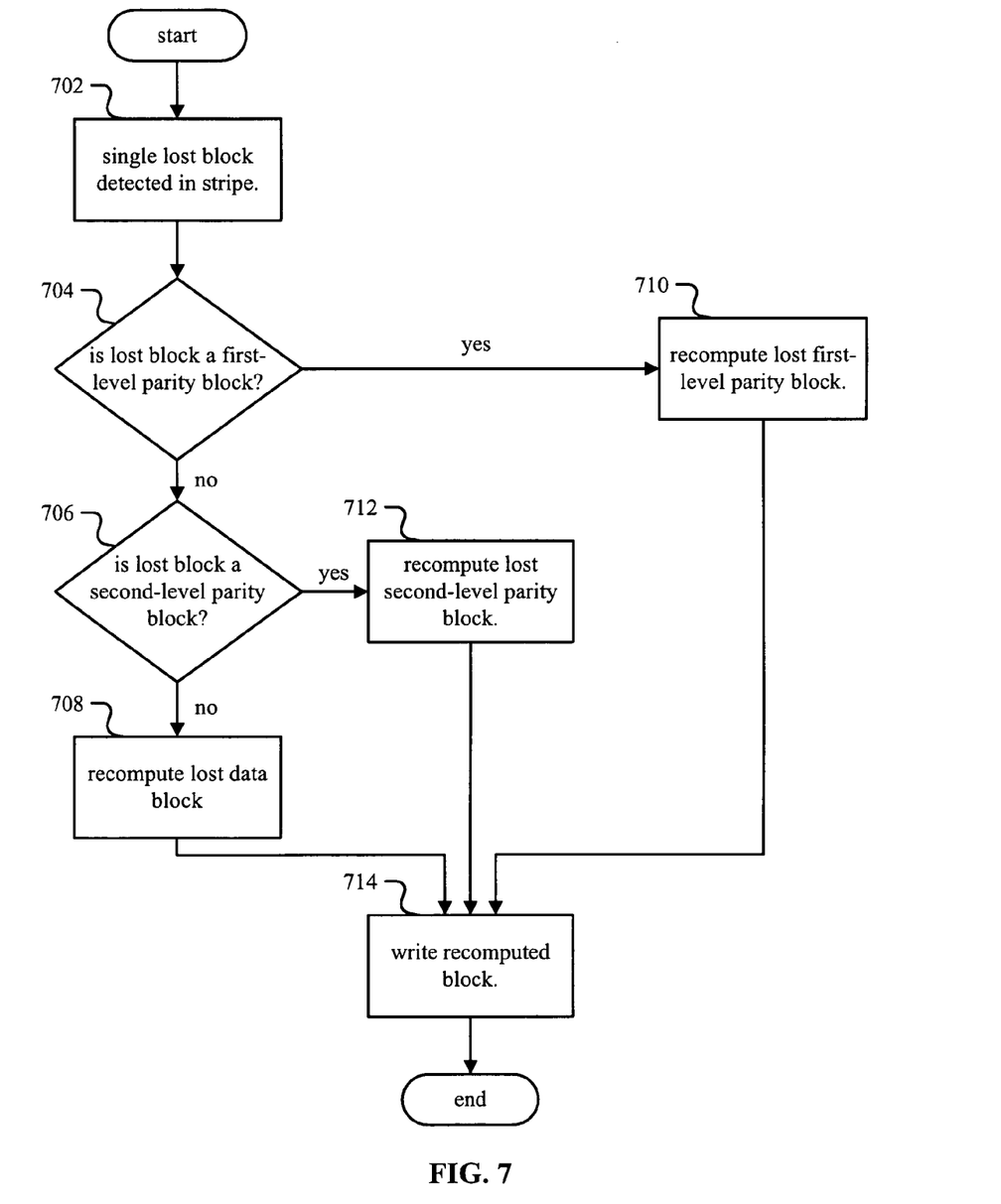
FIG. 7 is a flowchart illustrating an embodiment of a process for a single block reconstruction of a given stripe.

FIG. 7 is a flowchart illustrating an embodiment of a process for a single block reconstruction of a given stripe. Throughout this specification, a "single block reconstruction" refers to the process of reconstructing the contents of a lost block and rewriting the contents to the given stripe. The process may be implemented in read/write controller 104.

In step 702, the single lost block and its location is detected in the given stripe. If it is determined in step 704 that the lost block type is a first-level parity block, then control is transferred to 710; otherwise control is transferred to 706. If it is determined in step 706 that the lost block type is a second-level parity block, then control is transferred to step 712; otherwise control is transferred to 708.

In step 708, the lost data block is recomputed using data recovery function 412 from the other data blocks and the parity block in the corresponding proper subset of the lost data block. In step 710, the lost first-level parity block is recomputed using first-level parity function 402 or first-level parity alternate function 404, depending on the system. In step 712, the lost second-level parity block is recomputed using second-level parity function 406. In step 714, the recomputed block is rewritten over the lost block in the given stripe.

Figure 8:
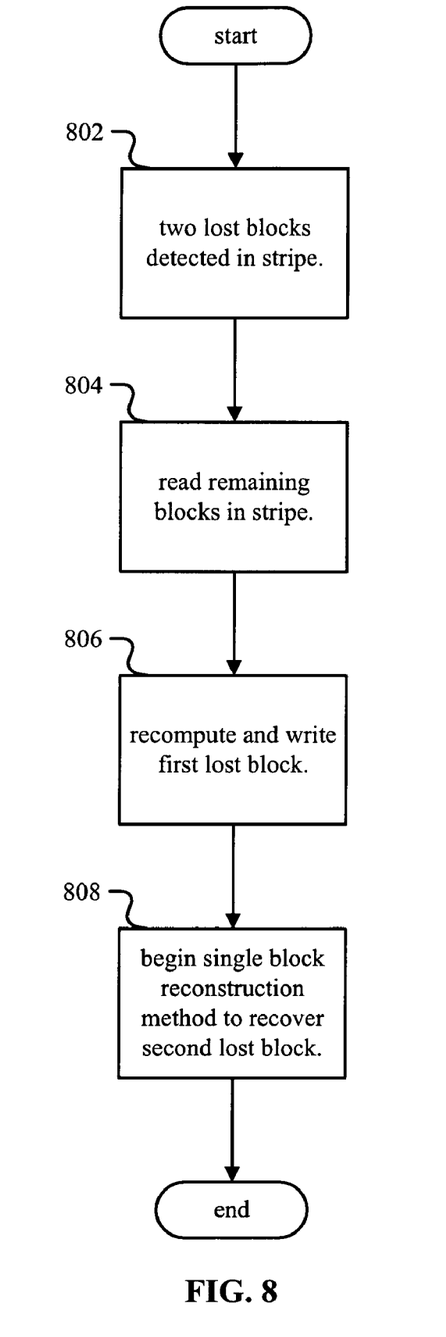
FIG. 8 is a flowchart illustrating an embodiment of a process for a double block reconstruction of a given stripe.

FIG. 8 is a flowchart illustrating an embodiment of a process for a double block reconstruction of a given stripe. Throughout this specification, a "double block reconstruction" refers to the process of reconstructing the contents of two lost blocks and rewriting the contents to the given stripe. The process may be implemented in read/write controller 104.

In step 802, the two lost blocks and their locations are detected in the given stripe. In step 804, with a double reconstruction it is required to read all the remaining blocks in the given stripe. In step 806, the first lost block is recomputed using generic block recovery function 414 based on the remaining blocks read in 804. In step 808, the second lost block is recomputed using the single block reconstruction of FIG. 7.

Figure 9:
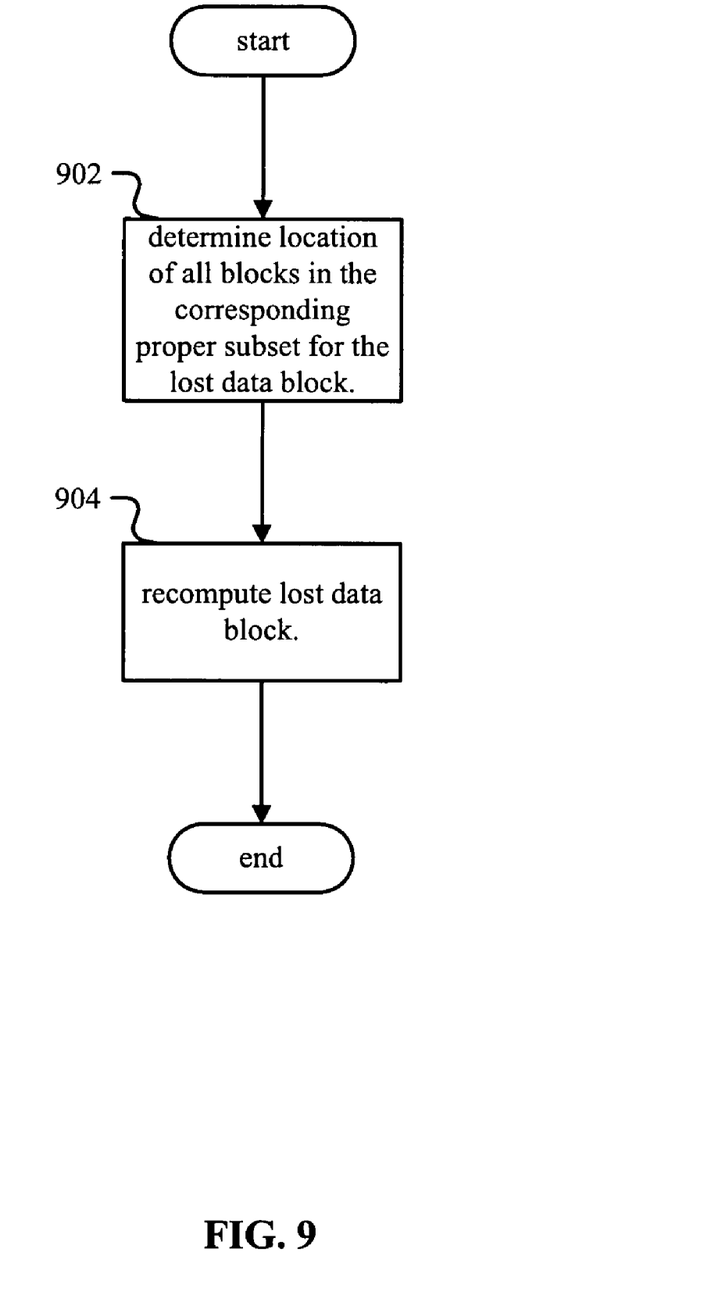
FIG. 9 is a flowchart illustrating an embodiment of a process for a degraded block read of a given stripe.

FIG. 9 is a flowchart illustrating an embodiment of a process for a degraded block read of a given stripe. Throughout this specification, a "degraded block read" refers to the process of reconstructing the contents of a lost data block for the purposes of a read access to the lost data block. The process may be implemented in read/write controller 104.

In step 902, the location of all blocks in the lost data block's corresponding proper subset are determined. In step 904, the lost data block is recomputed for the read access by using data recovery function 412. In a similar manner, a double degraded read, or a degraded read with two lost blocks, can be completed by performing a double block reconstruction if the lost blocks are both data blocks, or by performing a single block reconstruction if one lost block is a data block and one lost block is a parity block, or by not requiring any action if the lost blocks are both parity blocks.

Figure 10:
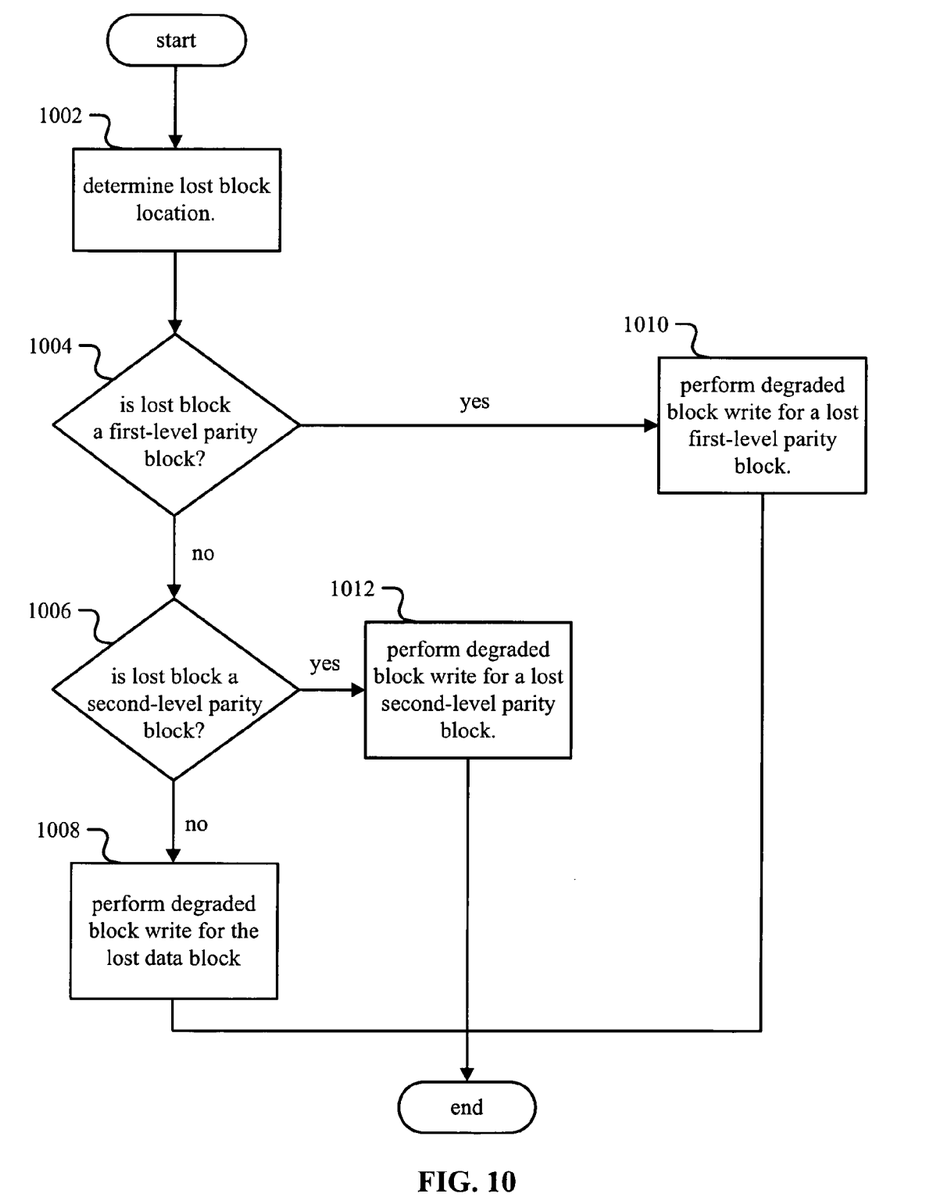
FIG. 10 is a flowchart illustrating an embodiment of a process for a degraded block write of a given stripe.

FIG. 10 is a flowchart illustrating an embodiment of a process for a degraded block write of a given stripe. Throughout this specification, a "degraded block write" refers to the process of reconstructing the contents of a lost block for the purposes of a write access to a data block. The process may be implemented in read/write controller 104. In a degraded block write, the lost block cannot be rewritten to, but the data and parity blocks corresponding to the lost block must be updated for future access.

In step 1002, the lost block's location is determined. If it is determined in step 1004 that the lost block is a first-level parity block, then control is transferred to step 1010; otherwise control is transferred to step 1006. If it is determined in step 1006 that the lost block is a second-level parity block, then control is transferred to step 1012; otherwise control is transferred to step 1008.

In step 1008, a degraded block write for a lost data block is performed. In step 1010, a degraded block write for a lost first-level parity block is performed. In step 1012, a degraded block write for a second-level parity block is performed. In a similar manner, a double degraded write, or a degraded write with two lost blocks, can be completed by performing a double block reconstruction if the lost blocks are both data blocks, or by performing a single block reconstruction if one lost block is a data block and one lost block is a parity block, or by not requiring any action if the lost blocks are both parity blocks.

Figure 11:
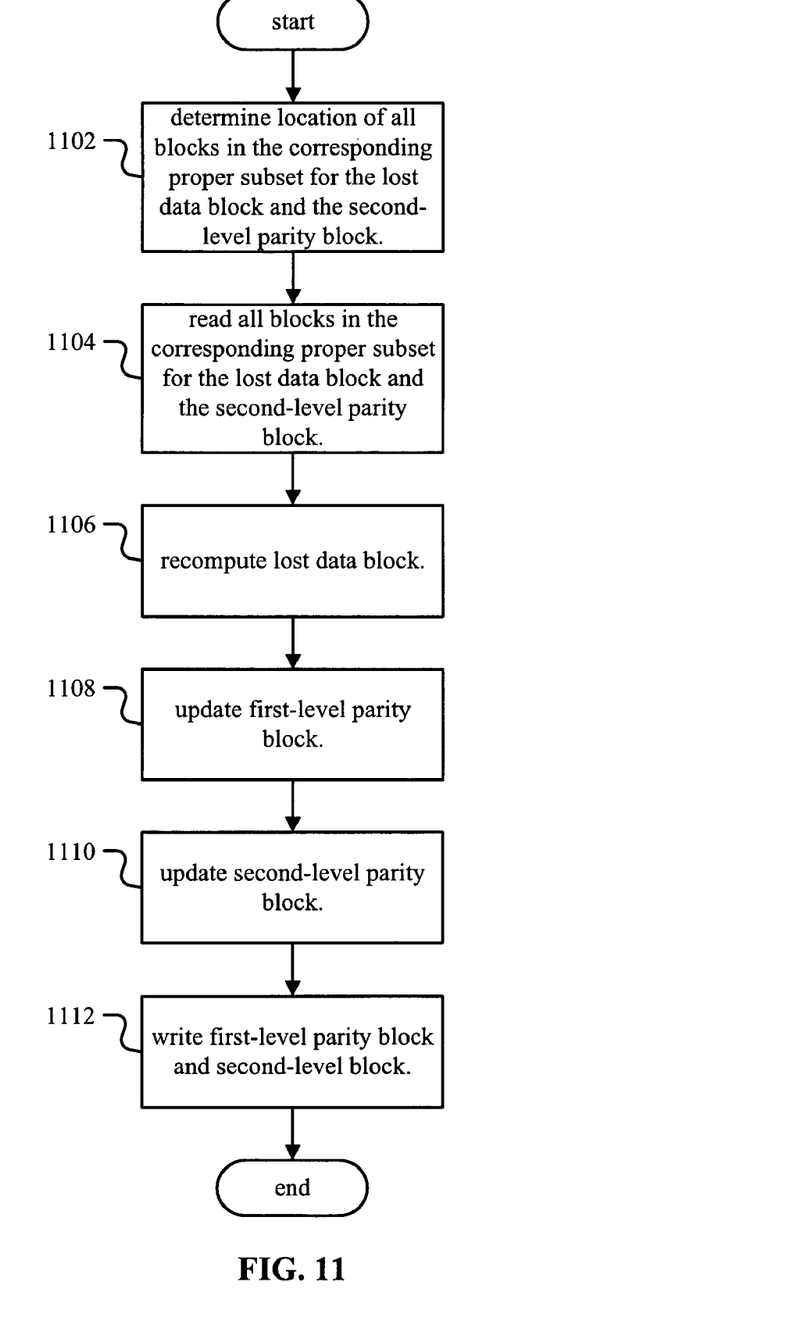
FIG. 11 is a flowchart illustrating an embodiment of a process for a degraded block write for a lost data block of a given stripe.

FIG. 11 is a flowchart illustrating an embodiment of a process for a degraded block write for a lost data block of a given stripe. In some embodiments, the process of FIG. 11 is included in 1008 of FIG. 10. The process may be implemented in read/write controller 104.

In step 1102, the location of all blocks in the proper subset corresponding to the lost data block and the second-level parity block are determined. In step 1104, all blocks in the proper subset corresponding to the lost data block and the second-level parity block are read.

In step 1106, the lost data block is recomputed using data recovery function 412. In step 1108, the corresponding first-level parity block is recomputed using the recomputed data block from 1106 using first-level parity update function 408. In step 1110, the second-level parity block is recomputed using the recomputed data block from 1106 using second-level parity update function 410. In step 1112, the updated first-level parity block and updated second-level parity block are written to the given stripe.

Figure 12:
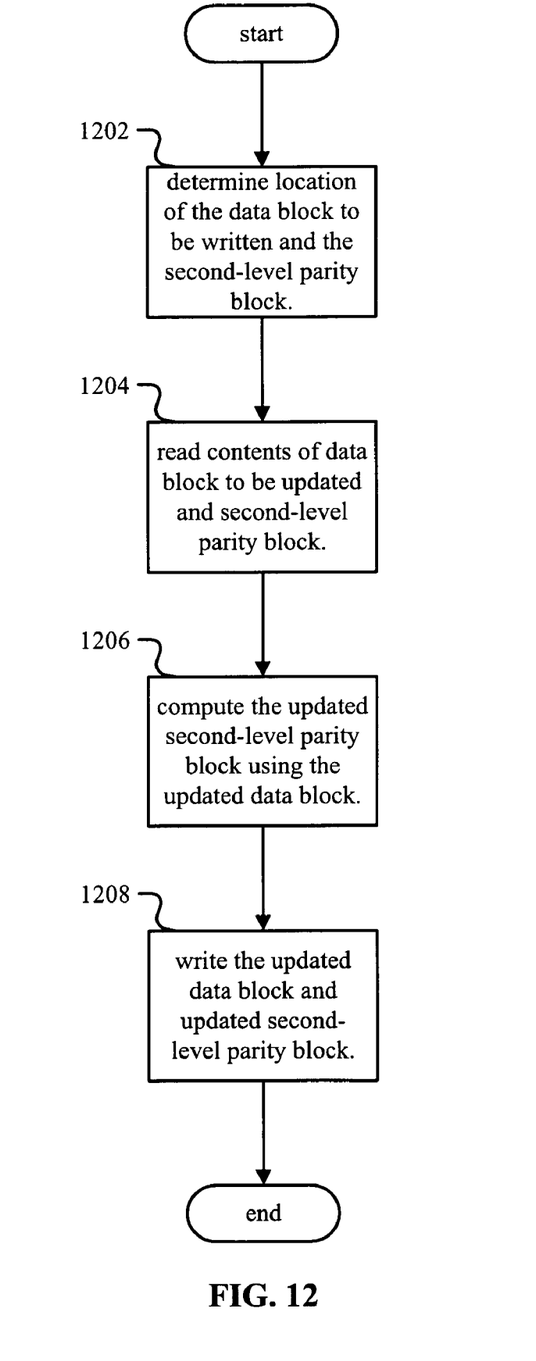
FIG. 12 is a flowchart illustrating an embodiment of a process for a degraded block write for a lost first-level parity block of a given stripe.

FIG. 12 is a flowchart illustrating an embodiment of a process for a degraded block write for a lost first-level parity block of a given stripe. In some embodiments, the process of FIG. 12 is included in 1010 of FIG. 10. The process may be implemented in read/write controller 104.

In step 1202, the location of the data block to be written and the second-level parity block are determined. In step 1204, the contents of the data block to be updated and the second-level parity block are read. In step 1206, the updated second-level parity block is computed using the second-level parity function 410. In step 1208, the updated data block and updated second-level parity block are written to the given stripe.

Figure 13:
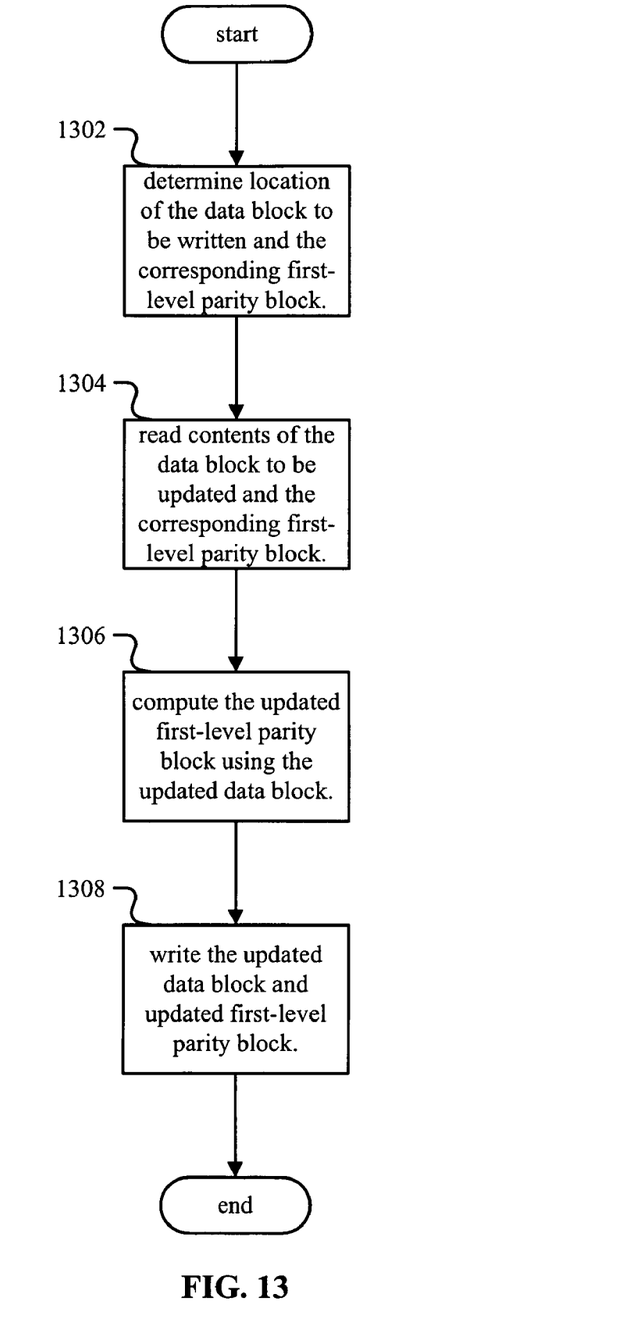
FIG. 13 is a flowchart illustrating an embodiment of a process for a degraded block write for a lost second-level parity block of a given proper subset of a given stripe.

FIG. 13 is a flowchart illustrating an embodiment of a process for a degraded block write for a lost second-level parity block of a given proper subset of a given stripe. In some embodiments, the process of FIG. 13 is included in 1012 of FIG. 10. The process may be implemented in read/write controller 104.

In step 1302, the location of the data block to be written and the corresponding first-level parity block are determined. In step 1304, the contents of the data block to be updated and the corresponding first-level parity block are read. In step 1306, the corresponding updated first-level parity block is computed using either the first-level parity function 402 or first-level parity alternate function 404, depending on the system. In step 1308, the updated data block and corresponding updated first-level parity block are written to the given proper subset.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system including:
   a set of data blocks, including a plurality of proper subsets of data blocks;
   a plurality of first-level parity blocks wherein each first-level parity block is generated from a corresponding proper subset of data blocks within the plurality of proper subsets of data blocks without reference to other data blocks not in the corresponding proper subset; and
   a second-level parity block wherein the second level parity block is generated from a plurality of data blocks included in at least two of the plurality of proper subsets of data blocks;
   wherein recovery of a lost block in a given proper subset of data blocks may be completed without reference to any data blocks not in the given proper subset.

2. A system as recited in claim 1, wherein the data blocks and the parity blocks are organized into stripes.

3. A system as recited in claim 1, wherein each proper subset of data blocks is nonoverlapping.

4. A system as recited in claim 1, wherein each first level parity block is generated from the second-level parity block and a corresponding proper subset of data blocks within the plurality of proper subsets of data blocks without reference to other data blocks not in the corresponding proper subset.

5. A system as recited in claim 1, wherein a position of the data blocks and the parity blocks are rotated within a given stripe as compared to other stripes.

6. A system as recited in claim 1, wherein the system is configured to perform a whole stripe write of a given stripe with m proper subsets of up to n data blocks, by:
   computing $P[1]$ through $P[m]$, where $P[z]$ is a function of at least $D[z,1], \ldots,$ and $D[z,n]$, and where $D[x,y]$ is a y-th data block of an x-th proper subset in the given stripe with m proper subsets of up to n data blocks; and
   computing Q, the second-level parity block for the given stripe with m proper subsets of up to n data blocks, as a function of at least $D[1,1], \ldots,$ and $D[m,n]$.

7. A system as recited in claim 1, wherein the system is configured to perform a single block update of D, a data block of a given proper subset of a given stripe, by:
   determining a location for:
   D;
   P, a first-level parity block generated from the given proper subset; and
   Q, the second-level parity block for the given stripe;
   computing P' as a function of at least D and P; and
   computing Q', as a function of at least D and Q.

8. A system as recited in claim 1, wherein the system is configured to perform a single block reconstruction of P, a first-level parity block of a given proper subset of a given stripe, by:
   determining a location for:
   P;
   $D[1], \ldots, D[n]$, where $D[x]$ is an x-th data block of the given proper subset; and
   Q, the second-level parity block of the given stripe; and
   recomputing P, as a function of at least $D[1], \ldots,$ and $D[n]$.

9. A system as recited in claim 1, wherein the system is configured to perform a single block reconstruction of Q, the second-level parity block of a given stripe of m proper subsets of up to n data blocks, by:
   determining a location for:
   $P[1], \ldots P[m]$, where $P[x]$ is an x-th proper subset's first-level parity block of the given stripe of m proper subsets of up to n data blocks;
   $D[1,1], \ldots, D[m,n]$, where $D[x,y]$ is a y-th data block of an x-th proper subset in the given stripe with m proper subsets and of up to n data blocks; and
   Q; and
   recomputing Q, as a function of at least $D[1,1], \ldots,$ and $D[m,n]$.

10. A system as recited in claim 1, wherein the system is configured to perform a single block reconstruction of $D[i]$, an i-th data block of a given proper subset of n data blocks, by:
   determining a location for:
   P, a first-level parity block for the given proper subset of n data blocks; and
   $D[1], \ldots, D[i-1], D[i+1], \ldots D[n]$, where $D[x]$ is an x-th data block of the given proper subset of n data blocks; and
   recomputing $D[i]$ as a function of at least $D[1], \ldots, D[i-1], D[i+1], \ldots, D[n]$, and P.

11. A system as recited in claim 1, wherein the system is configured to perform a double block reconstruction of $B[i]$, an i-th data block on a given stripe of n blocks, and $B[j]$, a j-th data block of the given stripe of n blocks, by:
   recomputing $B[i]$, as a function of at least $B[1], \ldots, B[i-1], B[i+1], \ldots, B[j-1], B[j+1], \ldots,$ and $B[n]$; and
   recomputing $B[j]$, by performing a single block reconstruction.

12. A system as recited in claim 1, wherein the system is configured to perform a degraded block read of $D[i]$, an i-th data block of a given proper subset of n data blocks by:
   determining a location for:
   P, a first-level parity block for the given proper subset of n data blocks; and
   $D[1], \ldots, D[i-1], D[i+1], \ldots D[n]$, where $D[x]$ is an x-th data block of the given proper subset of n data blocks; and
   recomputing $D[i]$ as a function of at least $D[1], \ldots, D[i-1], D[i+1], \ldots, D[n]$, and P.

13. A system as recited in claim 1, wherein the system is configured to perform a degraded block write of D[i], an i-th data block of a given proper subset of n data blocks of a given stripe, when D[i] is lost, by:
- determining a location for:
  - D[1], ..., D[i−1], D[i+1], ... D[n], where D[x] is an x-th data block of the given proper subset of n data blocks;
  - P, a first-level parity block for the given proper subset of n data blocks; and
  - Q, the second-level parity block of the given stripe;
- recomputing D[i] as a function of at least D[1], ... D[i−1], D[i+1], ... D[n], and P;
- computing P' as a function of at least D[i] and P; and
- computing Q' as a function of at least D[i] and Q.

14. A system as recited in claim 1, wherein the system is configured to perform a degraded block write of D, a data block of a given proper subset of a given stripe, when P, a first-level parity block for the given proper subset, is lost, by:
- determining a location for:
  - D; and
  - Q, the second-level parity block for the given stripe;
- computing Q' as a function of at least D and Q.

15. A system as recited in claim 1, wherein the system is configured to perform a degraded block write of D, a data block of a given proper subset of a given stripe, when Q, the second-level parity block of the given stripe, is lost, by:
- determining a location for:
  - D; and
  - P, a first-level parity block of the given proper subset;
- computing P' as a function of at least D and P.

16. A method of storing data, by:
- storing a set of data blocks in a memory unit, including a plurality of proper subsets of data blocks;
- generating a plurality of first-level parity blocks wherein each first-level parity block is generated from a corresponding proper subset of data blocks within the plurality of proper subsets of data blocks without reference to other data blocks not in the corresponding proper subset; and
- generating a second-level parity block wherein the second level parity block is generated from a plurality of data blocks included in at least two of the plurality of proper subsets of data blocks;
- wherein recovery of a lost block in a given proper subset of data blocks is possible without reference to any data blocks not in the given proper subset.

17. A method as recited in claim 16, wherein the data blocks and the parity blocks are organized into stripes.

18. A method as recited in claim 16, wherein each proper subset of data blocks is nonoverlapping.

19. A method as recited in claim 16, wherein each first level parity block is generated from the second-level parity block and a corresponding proper subset of data blocks within the plurality of proper subsets of data blocks without reference to other data blocks not in the corresponding proper subset.

20. A method as recited in claim 16, wherein a position of the data blocks and the parity blocks are rotated within a given stripe as compared to other stripes.

* * * * *